Patented Apr. 8, 1924.

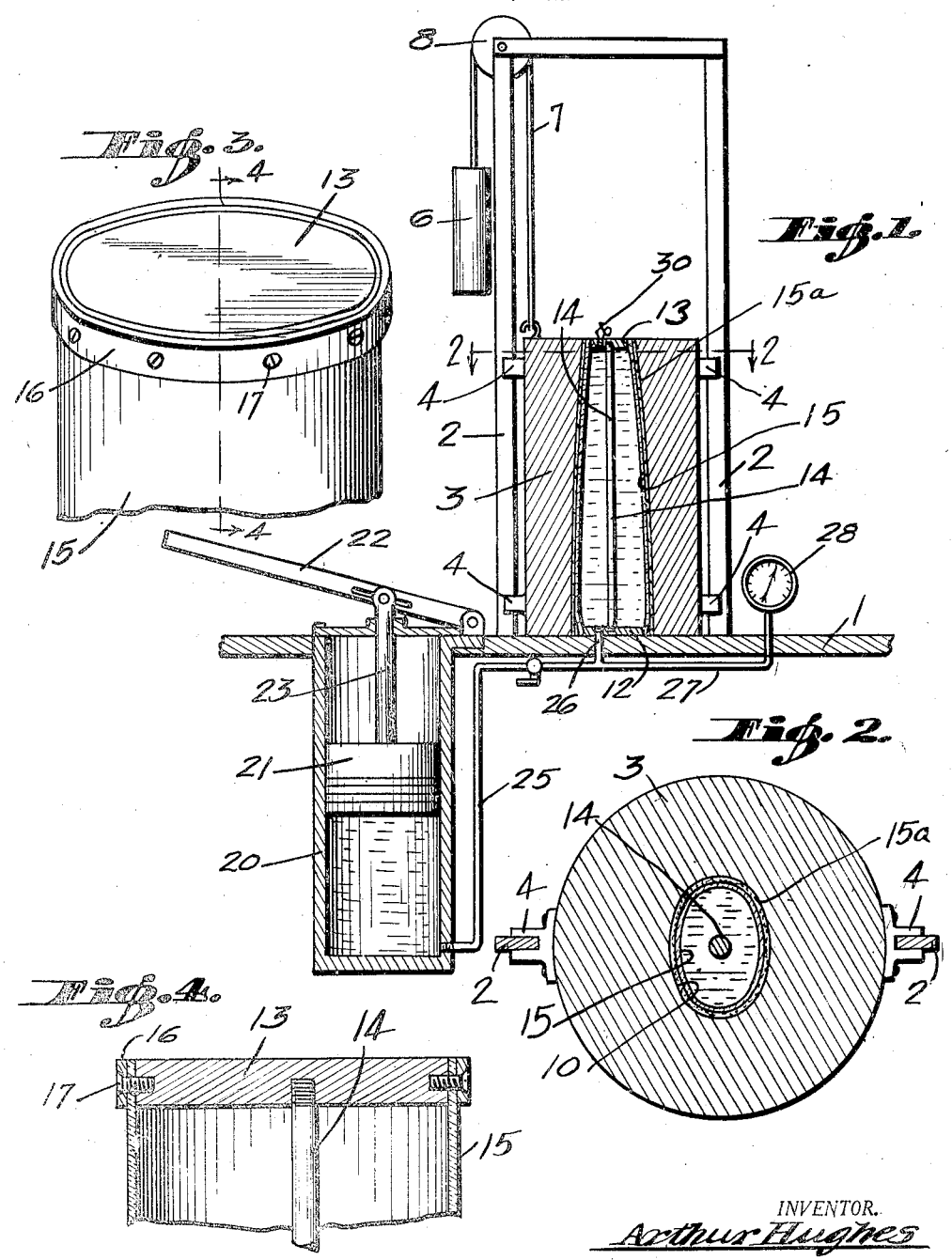

1,489,941

UNITED STATES PATENT OFFICE.

ARTHUR HUGHES, OF LOS ANGELES, CALIFORNIA.

PUTTY-MOLDING MACHINE.

Application filed June 2, 1921. Serial No. 474,434.

*To all whom it may concern:*

Be it known that I, ARTHUR HUGHES, a citizen of the United States, residing at Los Angeles, in the county of Los Angeles and State of California, have invented new and useful Improvements in Putties-Molding Machines, of which the following is a specification.

This invention is a machine for molding putties, or similar articles of leather or the like, and has for its object the provision of an expansible core received within the putty and adapted to press the putty outwardly against the wall of a mold in which the putty is received, and in order to cause the putty to conform to the shape of the wall of the mold.

The expansible core is preferably expanded by hydraulic pressure, and a machine is thus provided which is of simple construction, but which will efficiently mold a putty or the like to the form of any desired mold.

The invention will be readily understood from the following description of the accompanying drawings, in which:

Figure 1 is a vertical section through an apparatus constructed in accordance with the invention.

Fig. 2 is a tranesverse section on the line 2—2 of Fig. 1.

Fig. 3 is a perspective view of the head of the expansible core.

Fig. 4 is a vertical section on the line 4—4 of Fig. 2.

The improved apparatus may include a base 1 supporting a guide frame 2 in which is slidable a mold 3 having the projecting brackets 4 co-operating with the sides of the guide frame to permit vertical movement of the mold. A counterweight 6 may be connected to the mold by a flexible connection 7 passing over a pulley 8.

The mold 3 is provided with a bore 10, one of which is of the shape to which it is desired to mold a putty or the like, and an expansible core is mounted upon base 1 so that the mold may be lowered over the same or elevated so as to disengage said core.

The core includes end plates 12 and 13, the former of which rests upon base 1, and the latter of which is spaced above the same as by a rod 14. A tube 15 preferably of resilient material, such as rubber, is received around rod 14 in spaced relation therefrom, and the ends of the tube extend over the peripheries of plates 12 and 13. The ends of the tube are fixed to the peripheries of said end plates as by clamping rings 16 held in position by screws 17.

In practice the expansible core is collapsed and a putty 15$^a$, which is to be molded, is received over the same and the mold 3 is then lowered over the putty. The core is then expanded as by hydraulic pressure so as to force the putty against the bore of the mold 3 and thereby cause the putty to conform to the contour of said bore.

The means for supplying hydraulic pressure to the expansible core may include a cylinder 20 carried by base 1 and having the piston 21 movable therein as by a handle 22 connected to the piston rod 23. Fluid is contained within cylinder 20 beneath piston 21 and is adapted to be forced therefrom when the piston is depressed as through a conduit 25 leading to a nipple 26 threaded into the end plate 12 of the expansible core so that the fluid under pressure may be discharged into the expansible core. A branch pipe 27 from conduit 25 preferably leads to a suitable pressure gauge 28. A pet cock 30 is arranged upon the end plate 13 of the expansible core so as to permit the escape of the air from said core.

It will be understood that when in use the air is first released from the expansible core, and the pet cock is then closed so that fluid may be discharged into the expansible core to any desired pressure. After the putty has been molded, the fluid is allowed to escape from the expansible core and back through the conduit 25 to the cylinder 20 as by moving piston 21 in the reverse direction. As a consequence the core is collapsed ready for subsequent operation of the apparatus. During the withdrawal of the fluid from the expansible core, the pet cock 30 is opened so as to allow the fluid to readily flow from the core.

Various changes may be made without departing from the spirit of the invention as claimed.

What is claimed is:

1. A molding apparatus for putties comprising a mold, end plates, an expansible tubular member secured at its ends to said plates, with the plates closing the ends of the member, means for rigidly connecting the plates, and means for supplying a fluid under pressure to said member.

2. A molding apparatus for putties comprising a frame, a mold in the frame, a stationary core comprising end plates, an expansible tube embracing the plates, clamping rings for securing the ends of the tube to said plates, and means for expanding the tube, said mold being slidable in said frame to be received around said core.

3. A molding apparatus for putties, comprising a frame, a mold in the frame, a stationary core comprising end plates, and an expansible tube embracing the plates and secured thereto, and means for expanding the tube, said mold being slidable in said frame to be received around said core.

In testimony whereof I have signed my name to this specification.

ARTHUR HUGHES.